Sept. 20, 1938.   H. W. HAPMAN   2,130,492
CONVEYER-ELEVATOR
Filed Feb. 20, 1937    5 Sheets-Sheet 3

Patented Sept. 20, 1938

2,130,492

UNITED STATES PATENT OFFICE 2,130,492

CONVEYER-ELEVATOR

Henry W. Hapman, Detroit, Mich.

Application February 20, 1937, Serial No. 126,797

6 Claims. (Cl. 198—170)

My invention relates to conveying and elevating apparatus of the "flight" type, which consists essentially of a fixed casing having moving elements therewithin and which are adapted for handling in bulk condition loose, granular, or pulverulent materials such as cement, coal, sand, and other minerals, as well as grain, legumes, chemicals, and so forth, and its principal object is to provide an apparatus of the character referred to which may be made up from standard sections, which may be manufactured economically by mass production methods, and which may be installed with a minimum of labor and laying out work.

Another object of my said invention is to provide an apparatus which may be adapted with equal facility for conveying materials in a horizontal, vertical, or inclined direction so as to meet all possible requirements of the material handling field.

Another object of my invention is to provide an apparatus in which the stationary casing is kept full of material throughout its entire operative length, thereby handling material such as coal with a minimum of breakage and depreciation, eliminating the possibility of explosions, and affording the maximum capacity in relation to the size of the casing while operating at comparatively slow speed.

Another object of my invention is to provide an apparatus in which the pull upon the moving elements is applied upon their axis or geometric center, whereby eccentric loading is avoided and a maximum capacity is obtained for a given strength of the parts, whereby also friction of the parts is reduced to a minimum so that the apparatus is capable of operating continuously over long periods without attention or repairs, whereby, further, a minimum amount of power is consumed.

Another object of my invention is to provide an apparatus in which all moving parts are enclosed so as to obtain the greatest safety of operation and eliminate all of the usual hazards, which also may be loaded effectively in any part of a horizontal or vertical run, and two different materials such as coal and ashes for example may be handled in different sections of the apparatus. Further, due to this construction, my device operates with a minimum noise, and leakage or spillage of material is avoided.

Still another object of my invention is to provide an apparatus in which the several sections of the casing are made symmetrical about their center line so that they may be turned over or reversed when one side becomes worn.

Another object is to provide a system of moving elements in which the "flights" or propellers are resiliently held upon the operating chain so that they can adapt themselves to inequalities without undue strain upon the parts, and also the material may be fed into or discharged from the apparatus at any point upon horizontal runs or inclines 45° or less from horizontal.

Still another object of my said invention is to provide an apparatus of the character referred to in which sprockets on curves or return ends are eliminated, and are employed only at the driving point.

With these and other objects in view, I will now describe a preferred embodiment of my invention, reference being had to the accompanying drawings in which—

Like characters designate corresponding parts throughout the several views.

Figure 1:
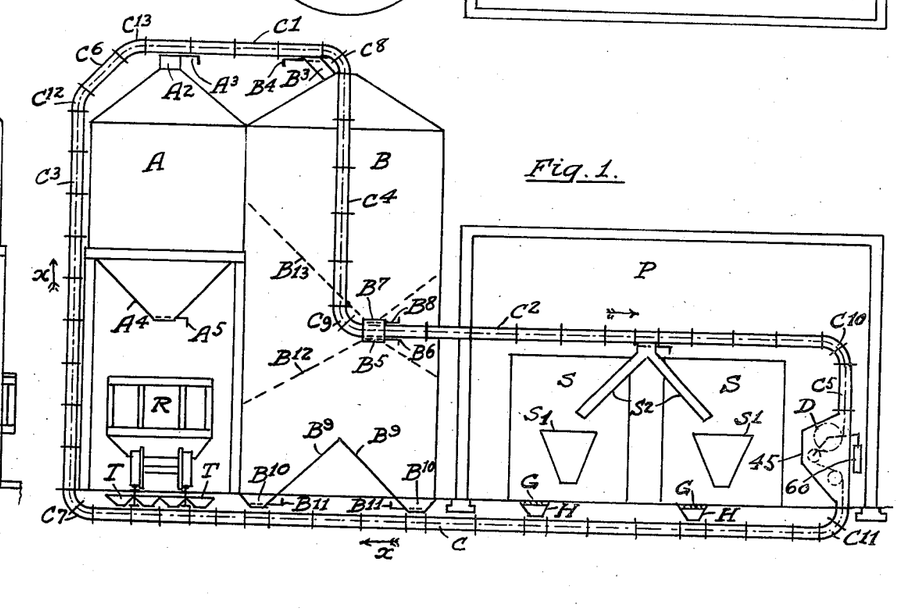
Figure 1 is a side elevation illustrating my improved conveyer-elevator as applied to handling and storing of coal and ashes in a conventional power plant.
Figure 2:
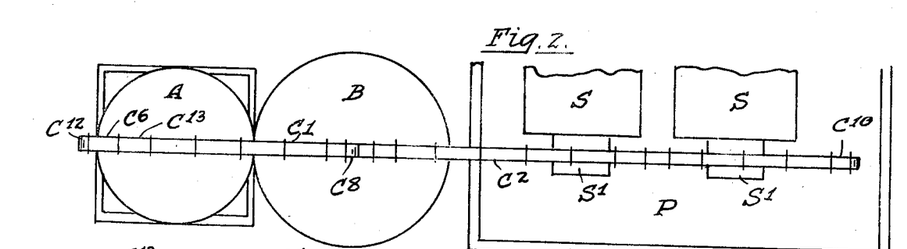
Figure 2 is a plan view of the same.
Figure 3:
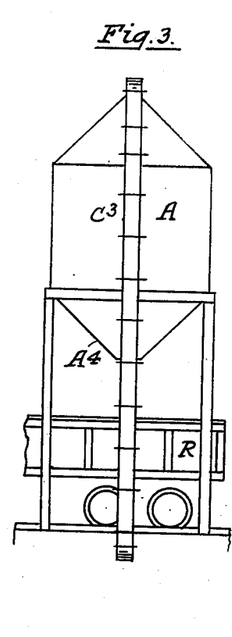
Figure 3 is an end elevation of the same.

Referring now more particularly to Figures 1, 2 and 3 of the drawings, A designates an ash storage bin and B a coal storage bin, while P represents a typical power house having therein boilers S, S which are provided with stoker hoppers S', S'.

C indicates in diagrammatic form the lower horizontal run or section of the conveyer, while C' and C2 indicate the upper horizontal runs. C3, C4 and C5 indicate vertical runs and C6 a short inclined run. Connecting the various runs above referred to are the 90 degree curved sections C7, C8, C9, C10 and C11, while C12 and C13 indicate 45 degree sections, the whole forming a continuous conveyer which is adapted to take coal from the railroad car R discharged into it through the track hoppers T and deliver it either to the coal storage bin B or to the two-way spout S2 which delivers it to the stoker hoppers S'. The conveyer also serves to carry ashes fed through the gratings G in the floor of the power house and through hoppers H to the horizontal run, the said ashes being carried in the direction of the arrows x and delivered through a chute A2 into the ash bin. The chute A2 is provided with a gate A3 which remains closed when coal is being unloaded from the railroad car. Connecting the coal bin B to the horizontal run C' of the conveyer is an inclined chute B3 having a gate B4, and upon the lower horizontal run C2 is a discharge opening B5 provided with a gate B6. Above the discharge opening B5 is an inlet opening B7 having a gate B8 for a purpose to be hereinafter explained. The bin B terminates at its lower end in inclined portions B9 which terminate in discharge hoppers B10 provided with gates B11. The ash bin A is provided at its lower end with a conical portion A4 having a gate A5.

During the initial storage of coal in the bin B the gates A3 and B4 are closed and coal is carried around from the track hoppers T and discharged through the opening B5 until the coal contained in the bin reaches the level indicated at B12. By this means, the amount of drop of the coal and consequent breakage is reduced to a minimum. When, however, the coal has reached the level thus indicated, the gate B4 is opened and coal is discharged through the chute B3 until the bin is entirely filled.

When it is desired to deliver coal directly to the stoker hoppers S', the gates B4 and B6 are closed and the coal is carried forward and discharged through the two-way chute S2, as will be understood. When it is desired to convey ashes from the power house floor to the bin A, the gate A3 is opened and ashes shoveled into the hoppers H are carried upward and delivered through the chute A2, as will be understood. D represents the driving sprocket of the conveyer through which it is driven by means of an electric motor and suitable intermediate gearing as will be hereinafter explained. Coal and ashes may sometimes be handled simultaneously.

During the initial unloading of the bin B, when the upper part of the same is filled with coal, the gate B6 being closed, the gate B8 is opened and coal is discharged therethrough into the conveyer and carried forward to the two-way chute S2 until the level of the coal in the bin reaches the position indicated at B13. After this has been accomplished, one of the gates B11 is opened and coal is discharged into the lower run C of the conveyer and then carried successively over the runs C3, C1, C4 and C2 to the stoker hoppers, as will be understood, the gates A3 and B4 being closed.

Referring now to Figures 4 to 12, inclusive, of the drawings, 1 designates a standard length or section of the casing formed from sheet metal and having at each end a flange 2 by which it is connected to adjacent sections. The said casing consists essentially of a pair of outer vertical side members 11; a pair of lower horizontal members 12 which are bent upwardly as indicated at 13 and secured by welding or other means to an inverted channel member 14; a pair of upper horizontal members 15 which are bent downwardly as indicated at 16 and are connected by welding or other means to a channel member 17. The channel members 14 and 17 are arranged in horizontal spaced relation so as to receive the links 18, 19 of the propelling chain, which rest upon the channel 14. The links 18 consist of plain bars of rectangular cross section having at each end openings adapted to receive pivotal pins 20, 21, while the links 19 are of similar construction, each having one end bent outwards as at 22 and terminate in notched portions 23 for a purpose to be hereinafter explained. The pins 20 extend outwardly on each side of the center line of the chain and carry a pair of conveying flights 24 which are pivotally mounted upon the said pins. Movement of the said flights about their pivots 20, however, is restricted by means of flat springs 25 which are carried upon the outwardly bent portions 22 of the links 19 and have their ends slidably received between vertical ribs 26 formed integral with the flights 24. Thus, the flights 24, which are designed to travel within the rectangular spaces upon each side of the channel members 14, 17, are resiliently carried by the chain along the insides of the casings 1 so as to convey any kind of material therealong. The method of connecting the flat springs 25 to the outwardly extending portions 22 of the links 19 is clearly shown in Figures 9 and 10, from which it will be seen that the outer ends of the members 22 are notched at 22' to receive parallel portions 26' of the springs which are secured within the notches by rectangular collars 27.

Figures 4, 5, 6, 7, 8, 9, 10, 11, 12:
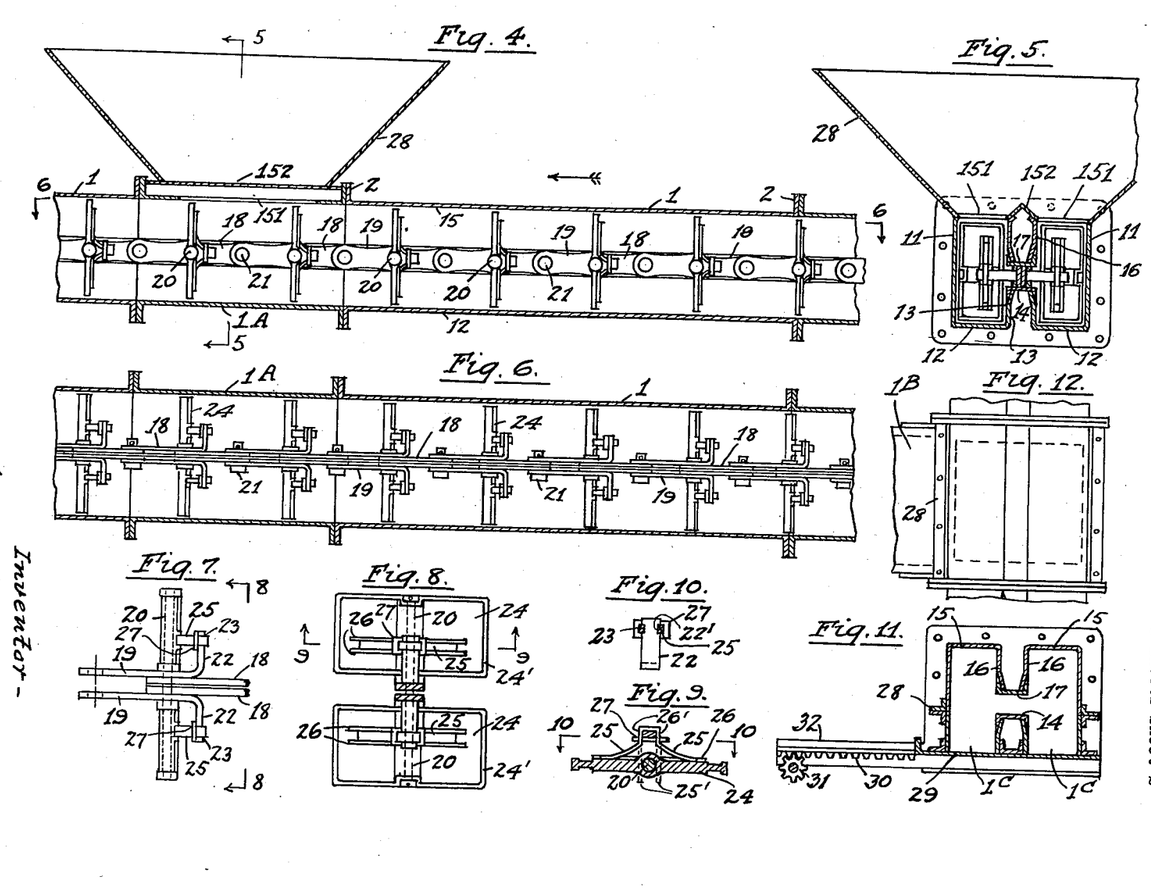
Figure 4 is a fragmentary longitudinal section, drawn to an enlarged scale, showing the construction of the casing and the moving elements therewithin, together with a simple form of feeding hopper.
Figure 5 is a transverse section of the same taken on line 5—5 of Figure 4.
Figure 6 is a fragmentary sectional plan view of the same taken on line 6—6 of Figure 4.
Figure 7 is a fragmentary plan view showing a pair of "flights" together with the associated chain links, drawn to a still larger scale.
Figure 8 is a sectional elevation of the same taken on line 8—8 of Figure 7.
Figure 9 is a sectional view taken on line 9—9 of Figure 8 illustrating the resilient mounting of the "flights" upon the links of the propelling chain.
Figure 10 is a fragmentary sectional view taken on line 10—10 of Figure 9.
Figure 11 is a transverse section corresponding to Figure 5, but drawn to an enlarged scale, showing a discharge gate applied to the underside of the casing.
Figure 12 is a fragmentary plan view of the same.

In assembling the springs 25 upon the portions 23 of the links 19, the two arms of the said springs are brought into parallel relation, as indicated at 25' in Figure 9, and the portions 26' are placed within the notches 22'. The rectangular members 27 are then slid over the members 25' until they come in contact with the inner surface of the portions 22. The ends of the springs 25, being then released, take up approximately the positions shown in Figure 9, so that they are held securely in position upon the links 19. The purpose of this resilient connection between the pins 20 and the flights 24 is to provide for accidental inequalities in the loading of the conveyer, such as the entrance of inordinately large pieces of material or of tramp iron or other foreign material, in which case the flights can move about the pins 20 so as to prevent breakage of any of the parts. This resilient pivotal connection of the flights is also advantageous in cases where the moving elements of the conveyer pass around curved portions of the casing, as will be hereinafter explained. The springs 25 are so designed as to hold the flights rigidly under normal loading of the same and to yield only under excessive strain.

The flights 24 are in general in the form of flat plates having thereupon circumferential flanges 24' which enable the flights to pick up residual material upon the vertical runs, so that the casing can be entirely emptied when desired.

It is contemplated that the casing will be manufactured in straight standard lengths as designated 1 in the drawings, but at certain points such as the curves C7, C12, and so forth, and at points in the horizontal runs where feeding hoppers or discharging chutes are employed, special sections will be provided. One of such special sections is indicated at 1A in Figures 4, 5 and 6, the said sections being surmounted by a feeding hopper 28. The upper horizontal members 15 of the casing, where they are jointed to the feeding hopper by welding or other means, are provided with openings 151 and intermediate these openings is an inverted V-shaped member 152 which serves to divert the material issuing from the feeding hopper into the said openings. The member 152 will be connected to the flanges of the section 1A of the main casing by welding or other means which are so well known in the art that further explanation of the same is deemed unnecessary.

Figures 11 and 12 of the drawings show fragmentary details of a special section 1B in which discharging openings 1C are provided in the lower surafce of the main casing. These openings are controlled by a sliding gate of any well known construction such as indicated at 29, the said gate, in the example shown, being operated backwards and forwards in a horizontal direction so as to open or close the openings 1C by means of a rack 30 and a co-acting pinion 31 in a manner well known in the art, the gate and its operating mechanism being guided by any suitable means such as the angle members 32 which are fixed to the casing. The section 1B is split horizontally as shown, the two parts being connected together by means of angles 28 and bolts passing therethrough, which arrangement facilitates assembly and inspection of the parts.

Figure 13:
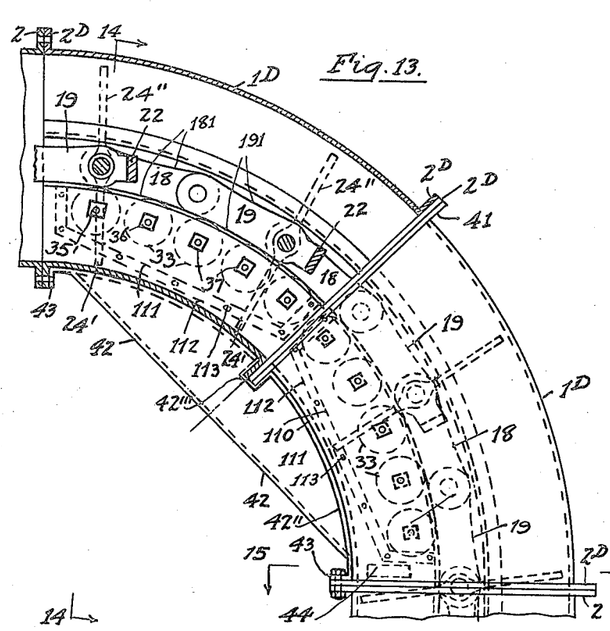
Figure 13 is a fragmentary side elevation, partly in section and drawn to a still larger scale, showing the casing and the moving elements therein as adapted for conveying material around a 90 degree curve.
Figure 14:
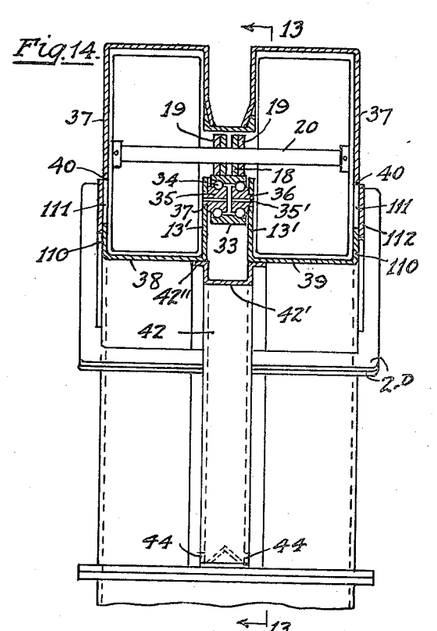
Figure 14 is a transverse section taken on line 14—14 of Figure 13.

Referring now to Figures 13, 14, 15, and 16, which show the construction of the casing employed when the conveyer passes around curves, in this case the sections of the casing, instead of being formed from sheet metal, as previously explained in regard to the straight sections, consist of cast iron sections designated 1D, preferably made in sections extending through an arc of 45 degrees and having integral flanges 2D connected to each other by bolts in the well known manner. In Figure 13 is shown a 90 degree curve comprising two standard sections as above described. In this case the chain links 18, 19, instead of travelling on channel members such as indicated at 14 in Figure 11, are supported on a series of anti-friction rollers 33 which are carried between the upwardly extending portions 13' of the casing. In one construction of these rollers, as shown in Figure 14 of the drawings, the said rollers are provided upon their inner periphery with arcuate grooves adapted to make rolling contact with anti-friction balls 34, the said balls being supported by grooved inner races 35, formed in pairs as shown, each of the said races having a squared outer portion 36 which fits in square holes 37 in the members 13' of the casing. In order to facilitate the insertion of the races 35 into the members 13, the casing 1D is formed in three arcuate pieces, one piece 37 forming the outer half of the casing and two other pieces 38, 39 forming the inner part of the casing, the portions 37 being joined to the portions 39 at 40, 40, the three sections being held in their relative respective positions by the flanges 2D which connect to the adjacent flanges 2 of the straight sections. At the point of juncture of the two 45 degree sections of casing, there is provided a U-shaped flange 41 which extends around three sides of the connected flanges 2D and so holds the parts together at this point.

In order to ensure that the chain links 18, 19 shall pass over the rollers 33 in a smooth and vibrationless manner, the central portions 181, 191 of the said links, intermediate their connecting pins 20, 21, are made of arcuate shape having a radius corresponding to the radius of a circle which will be tagential to the peripheries of the rollers, as shown clearly in Figure 13 of the drawings.

The spaces between the rollers 33 and their supporting races 36 are initially filled with grease so that the rollers will operate for a considerable period without attention, but in order to provide for the renewal of the grease, the races are provided with central openings 35' and the lower outer members 110 have therein openings 111 provided with cover plates 112 secured in position by bolts 113. It will be observed by reference to Figure 13 that the flights 24, being normally held by the springs 25 at right angles to the longitudinal axis of the chain links 18, will move at an angle to one another instead of being parallel as when operating within a straight section of the conveyer. This change in the relative positions of the adjoining flights will, when the conveyer casings are entirely filled, cause an intensified pressure between the inner wings 24' of the flights and a reduced pressure between the outer wings 24" of the flights, and it is one of the objects of the resilient mounting of the flights upon their supporting chain links to compensate for these differences in pressure which, if the flights were rigidly connected to their supporting links, would sometimes cause undue strain upon and breakage of the parts.

Figure 15:
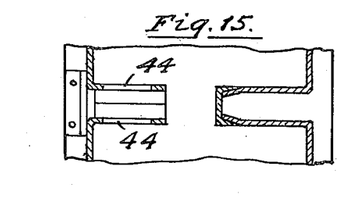
Figure 15 is a fragmentary sectional plan view taken on line 15—15 of Figure 13 showing a detail of the "dribble chute" to be hereinafter described.

It will be readily understood that when material is being conveyed around curved sections of the casing, such as above described, in which the channel members 14 which normally support the chain are absent, a small quantity of the material being conveyed will fall or "dribble" between the rollers 33, and in order to provide for this there is arranged within the inner portion of the curve a "dribble" chute 42 which consists of a channel-shaped member 42' having flanges 42" by which it is connected to the members 38, 39 by bolts or other suitable means. The upper and lower ends of the "dribble" chute 42 are also provided with flanges 43 which are connected to the adjacent flanges 2D by the same bolts which fasten the latter to the flanges 2 of the adjoining straight sections. In this manner, material which falls down between the rollers is directed to the lower portion of the curve and escapes through openings 44 into the adjoining straight section of the conveyer.

It will be noted that the "dribble" chute 42 is cut away as indicated at 42''' in Figure 13 in order to clear the flanges 2D of the curved sections of the casing; also, that instead of a U-shaped flange 41 for connecting the portions 37, 38, and 39 together, a rectangular metal frame or gasket may be interposed between the adjoining flanges 20. The 45 degree sections are made symmetrical and of exactly the same dimensions in every case so as to be interchangeable, and the rectilinear sections 1 of the casing have their upper and lower portions symmetrical so that they may be turned around through 180 degrees, so that the channel members 17 may be used to carry the propelling chain when the channel members 14 are worn to any great extent, the life of the sections being by this means doubled.

Figures 17, 19, 20:
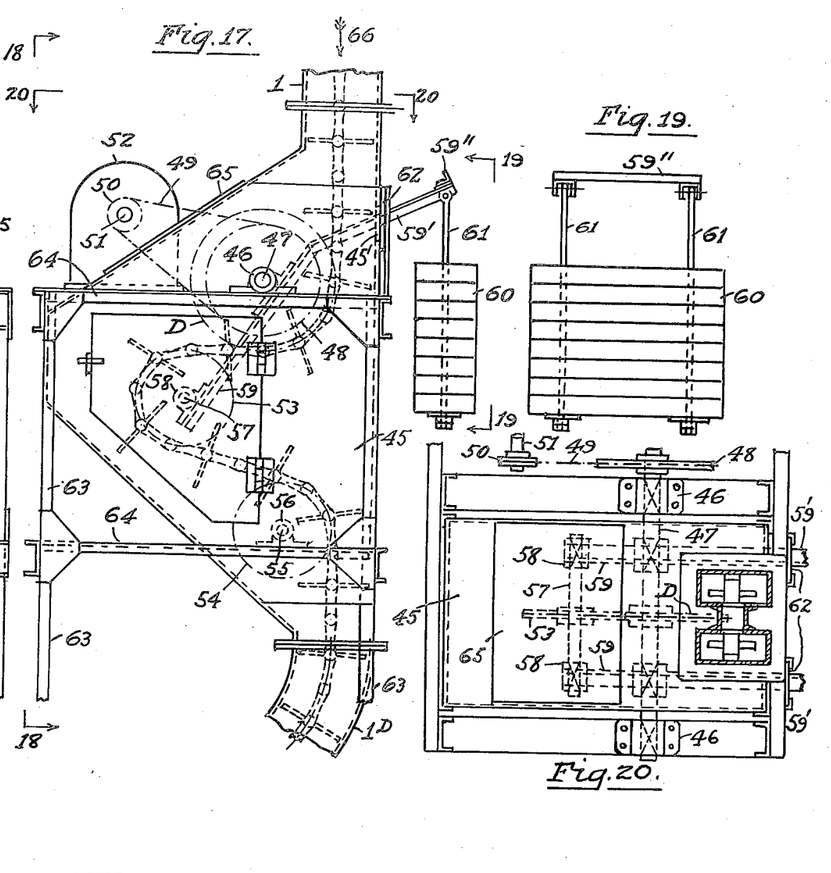
Figure 17 is a fragmentary side elevation of the driving or propelling mechanism of my improved conveyer-elevator together with the tensioning apparatus for taking up slack of the propelling chain.
Figure 19 is an elevational view taken on line 19—19 of Figure 17 showing the arrangement of the weights and associated elements for taking up the slack of the chain.
Figure 20 is a fragmentary sectional view taken on line 20—20 of Figure 17.
Figure 18:
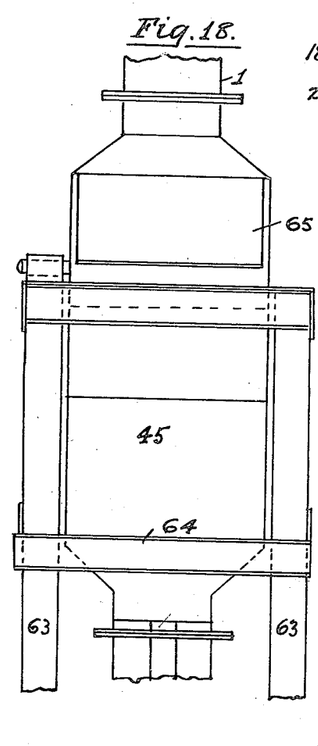
Figure 18 is an end view taken on line 18—18 of Figure 17.

Referring now to Figures 17, 18, 19, and 20 of the drawings, which show a preferred construction of the driving mechanism of my improved conveyer-elevator as well as the means for taking up slack of the chain due to wear or stretch of the same, 45 designates a housing interposed between a straight section 1 and a curved section 1D in Figure 17. The housing 45 and the associated driving mechanism may be placed in any part of the conveyer-elevator system in which no load is carried and, on account of the great strength of the propelling chain in relation to the load to be carried. it can even be put on the bottom of the system, which is not generally possible with existing types of conveyers and elevators.

In the diagram, Figure 1, the housing 45 is located between an upper vertical section C5 and a lower curved section C11 which are comparable, respectively, to the section 1 and 1D shown in Figure 17. Rotatably supported in bearings 46 is a shaft 47 upon which is keyed a driving sprocket D around which the conveyer chain passes as shown in Figure 17, and the shaft 47 carries upon its outer end a sprocket 48 which is connected by a chain 49 to a smaller sprocket 50 upon a shaft 51, as shown more clearly in Figure 20, the shaft 51 being connected by gearing or otherwise with an electric motor 52 shown in the side view, Figure 17. The conveyer chain. as shown in Figure 17, passes over an idler sprocket 53 and then over another idler sprocket 54. The idler sprocket 54 is mounted upon a shaft 55 rotatably supported in bearings 56, while the idler sprocket 53 is mounted upon a shaft 57 carried in bearings 58, which bearings are supported upon one end of a pair of levers 59, the said levers being rotatably mounted upon a shaft 47, as shown, and carrying at their ends 59' remote from the sprocket 53 a series of counter-weights 60 which are suspended from it by rods 61 and operate to maintain the conveyer chain in a taut condition and take up stretch and wear of the chain.

Then ends 59' of the levers 59 are connected by an angle member 59" and where they pass through the wall of the housing 45, are provided with sliding cover plates 62 which at all times cover slots 45' in the said wall, so that escape of dust through the said slots is prevented. The housing 45 is provided with structural supporting members 63 braced as at 64 and also with a removable cover plate 65 by which inspection of oiling of the driving elements within the housing is facilitated.

It will be observed that due to the fact that the greater part of the take up mechanism, together with idler sheaves, are fully enclosed within the housing 45, the escape of dust from the conveyer to the outside is prevented. Further, due to the fact that the incoming portion of the conveyer, designated 1 in Figure 17, is in vertical alignment with the curved outlet portion 1D, any residual material or dribble discharged from the upper end 1, the conveyer travelling in the direction indicated by the arrow 66, will fall directly into the said outlet portion so that clogging of the driving mechanism is avoided.

Referring now to Figures 21 to 24, inclusive, which illustrate a simple form of horizontal conveyer constructed in accordance wth my invention, C12 is the lower horizontal run, being the loaded portion of the conveyer travelling in the direction of the arrow 67 while C13 is the return run of the conveyer travelling in the direction of the arrow 68. D is the driving sprocket contained within the driving housing 45' in which is contained the take up sprocket 53 and the idler sprocket 54, the take up sprocket 53 being carried upon one end 59 of a lever pivoted at 47, the said lever having at its other end 59' counter-weights 60, 60, the whole mechanism operating in precisely the same manner as that described in relation to the driving mechanism illustrated in Figure 17, the sprocket D being driven from any suitable motor in the same manner. A lower curved portion C7 connects the lower run C12 of the conveyer with the housing 45' and the conveyer is fed from a hopper 69 through a suitable opening in the section 70 of the lower run, the material thus fed to the conveyer being discharged through a hopper 71. After leaving the discharge hopper 71, the conveyer, being then practically empty, passes around the curved portion 72 to the upper run C13. The curved portion 72 is made up from 45 degree sections similar to those shown in Figure 13, with the exception of the 45 degree section 73 in which, since no load is carried by the conveyer at that point, the anti-friction rollers may be dispensed with and the conveyer chain, together with its associated flight members, is carried upon a solid curved member 74 shown more particularly in Figures 23 and 24. The member 74 consists of a solid casting having an outer radius equal to the working radius of the chain links, as hereinbefore described, the said casting having thereupon squared portions 75 adapted to fit within square openings such as designated 37 in Figure 13, so that the section 73 is in general a duplicate of the section 1D in Figure 13, the only difference being that the solid member 74 is substituted for the series of antifriction rollers 33 before described.

Figures 21, 22, 23, 24, 25, 26, 27:
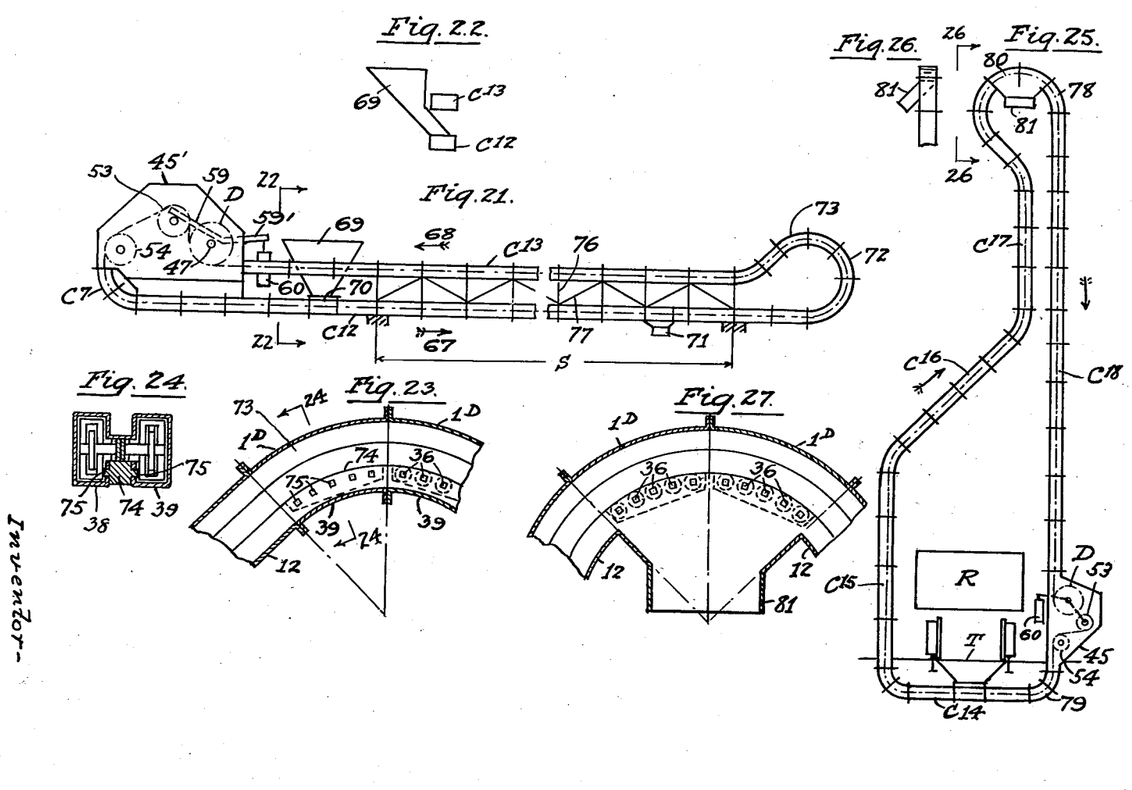
Figure 21 is a side elevation drawn to a reduced scale showing a simple form of horizontal conveyer constructed in accordance with my invention.
Figure 22 is a section on line 22—22 of Figure 21.
Figure 23 is a fragmentary longitudinal section, drawn to an enlarged scale, showing a modification of the chain supporting track adapted for use on curves in certain cases to be hereinafter explained.
Figure 24 is a section on line 24—24 of Figure 23.
Figure 25 is a side elevation drawn to reduced scale showing a simple form of vertical conveyer or elevator constructed in accordance with my invention.
Figure 26 is a fragmentary end elevation taken on line 26—26 of Figure 25.
Figure 27 is a fragmentary longitudinal section, drawn to an enlarged scale, illustrating the construction of the unloading chute at the upper end of the vertical conveyer shown in Figure 25.

It will be understood that the horizontal runs C12 and C13, being made up from sections of standard length, may be connected by vertical members shown diagrammatically at 76 in Figure 21, the said members being connected to the adjoining flanges of the several sections so that the two runs so combined may act as a truss which will be self-supporting through a span of considerable length between supports, and sometimes I may add diagonal members such as indicated at 77 adapted to form, in conjunction with the upper and lower runs and their vertical connecting members, a truss which is capable of being self-supporting of a considerably larger span, S.

In Figures 25, 26, and 27 of the drawings there is shown a simple form of vertical conveyer or elevator constructed in accordance with my invention. In this modification a short horizontal run C14 passes beneath and is fed by a track hopper T adapted to receive material from a railroad car R, and the conveyer then passes upwards through a vertical flight C15 and an inclined flight C16 to another vertical flight C17, whence it passes around the curved portion 78 and downwards through a vertical flight C18 to the drive sprocket D and over the take up sprocket 53 and the idler sprocket 54, and so around the curve 79 to the track hopper. The construction of the driving mechanism and its housing 45 is similar to that hereinbefore described, there being counterweights 60 operating to take up the slack of the chain, as will be understood.

Forming a part of the curved portion 78 of the conveyer is a 90 degree section 80 shown to a larger scale in Figure 27 in which the lower members 12 of the conveyer casing are omitted so that the material, being carried upwards, is discharged through the openings so formed, the said material being received in a hopper 81 which projects laterally from the center line of the conveyer, as indicated in Figure 26.

Figure 16:
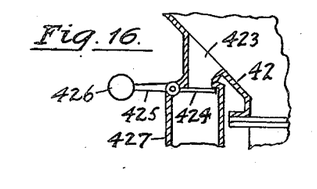
Figure 16 illustrates an alternative detail of the conveyer conduit to be hereinafter described.

While I have herein described and shown a preferred embodiment of my invention, it will be readily understood by those skilled in the art to which the same relates that I may make various changes and modifications to meet varying conditions and requirements, without departing from the spirit of the invention as defined in the appended claims. For example, in some cases, in order to provide for congestion or jamming of the "dribble" chute 42, shown in Figure 13, I may provide means for relieving excessive pressure in the said chute, said means, as shown in Figure 16 of the drawings, comprising an opening 423 normally closed by a pivoted valve 424 and an associated lever 425 and weight 426, the whole being so arranged that under excessive pressure the valve may be opened and the excess material discharged through a downwardly extending tubular member 427 and delivered to the lower run of the conveyer.

It will be observed, further, that while I have herein described my improved conveyer-elevator as adapted to the continuous transportation of a single class of material throughout the circuit, I may sometimes adapt my invention to the conveyance of different types of material in the upper and lower runs respectively, and also, in some cases, I may employ the two parallel longitudinal portions of the conduit to transport two different kinds of material along the same run.

Having thus described my said invention, what I claim and desire to secure by Letters Patent of the United States is:

1. A conveyer for transporting material in bulk comprising a closed conduit disposed in a desired circuit and provided with entry and discharge openings, and a conveyer chain operating in said conduit and provided with appropriate driving mechanism, said chain consisting of a series of links connected by transverse pivots and a series of flights resiliently mounted upon said pivots and adapted to sweep the interior of said conduit and to propel material therealong.

2. A conveyer for transporting material in bulk comprising a closed conduit disposed in a desired circuit and provided with entry and discharge openings; a conveyer chain operating in said conduit and provided with appropriate driving mechanism, said chain consisting of a series of links connected by transverse pivots; a series of flights rotatably mounted upon said pivots and adapted to sweep the interior of said conduit and to propel material therealong; and resilient means adapted to normally maintain the said flights at right angles to the direction of their travel, and to permit them to rotate about said pivots when their movement meets abnormal resistance.

3. A conveyer for transporting material in bulk comprising a closed conduit disposed in a desired circuit and provided with entry and discharge openings; a conveyer chain consisting of a series of links connected by transverse pivots and having end portions bent at right angles and arranged in parallel spaced relation with said pivots; a series of flights rotatably mounted upon said pivots and adapted to sweep the interior of said conduit and to propel material therealong; and resilient members carried upon said end portions and adapted to exert pressure upon said flights so as to normally maintain them at right angles to the direction of their travel and to permit them to rotate about said pivots when their movement meets abnormal resistance.

4. A conveyer for transporting material in bulk having a pair of substantially rectangular conduits arranged in parallel spaced relation and connected by a relatively shallow, centrally disposed space adapted to receive a conveyer chain; a chain operating in said space and provided with appropriate driving mechanism, said chain consisting of a series of links connected by transverse pivots; pairs of flights rotatably mounted upon said pivots and adapted to sweep the interiors of said conduits and to propel material therealong; and resilient means adapted to normally maintain the said flights at right angles to the direction of their travel and to permit them to rotate about said pivots when their movement meets abnormal resistance.

5. A conveyer for transporting material in bulk having a pair of substantially rectangular conduits arranged in parallel spaced relation and connected by a relatively shallow, centrally disposed space adapted to receive a conveyer chain; a chain operating in said space and provided with appropriate driving mechanism, said chain consisting of a series of links connected by transverse pivots and having end portions bent at right angles and arranged in parallel spaced relation with said pivots; pairs of flights rotatably mounted upon said pivots and adapted to sweep the interiors of said conduits and to propel material therealong; and resilient members carried upon said end portions and adapted to exert pressure upon said flights so as to normally maintain them at right angles to the direction of their travel and to permit them to rotate about said pivots when their movement meets abnormal resistance.

6. A conveyer for transporting material in bulk having a pair of substantially rectangular conduits arranged in parallel spaced relation and connected by a relatively shallow, centrally disposed space adapted to receive a conveyer chain; a chain operating in said space and provided with appropriate driving mechanism, said chain consisting of a series of links connected by transverse pivots; and pairs of flights rotatably mounted upon said pivots and adapted to sweep the interiors of said conduits and to propel material therealong.

HENRY W. HAPMAN.